United States Patent [19]

Luck

[11] 4,336,897
[45] Jun. 29, 1982

[54] RACK FOR BICYCLES

[76] Inventor: Arthur J. Luck, 1365 Estrella Dr., Santa Barbara, Calif. 93110

[21] Appl. No.: 212,738

[22] Filed: Dec. 3, 1980

[51] Int. Cl.³ .............................. B60R 9/06; B60R 9/10
[52] U.S. Cl. ............................... 224/42.03 B; 224/309; 224/314
[58] Field of Search ................. 224/42.03 B, 42.03 A, 224/42.03 R, 314, 309, 320; 211/17, 21, 22

[56] References Cited

U.S. PATENT DOCUMENTS

| 648,402 | 5/1900 | Haarmann et al. | 211/21 |
| 2,907,483 | 10/1959 | Pras | 224/42.03 R X |
| 3,670,935 | 6/1972 | Hinkston | 224/42.03 B |
| 3,927,810 | 12/1975 | Danon | 224/42.03 B X |
| 3,927,811 | 12/1975 | Nussbaum | 224/42.03 B |
| 4,085,874 | 4/1978 | Graber | 224/42.03 B |
| 4,182,467 | 1/1980 | Graber | 224/42.03 B X |

Primary Examiner—Allan N. Shoap

[57] ABSTRACT

A foldable support rack for carrying bicycles on a vehicle, comprising a pair of vertical support members joined at their upper ends by a cross member, provided with horizontally projecting carrying members and supported on the vehicle bumper as an upright rectangular array. Interconnections between support members, cross member, and carrying members allow rack to be easily folded to minimum volume for storage, and extended and locked into open configuration for use. Means are provided for attachment to a variety of vehicle configurations without use of tools.

6 Claims, 11 Drawing Figures

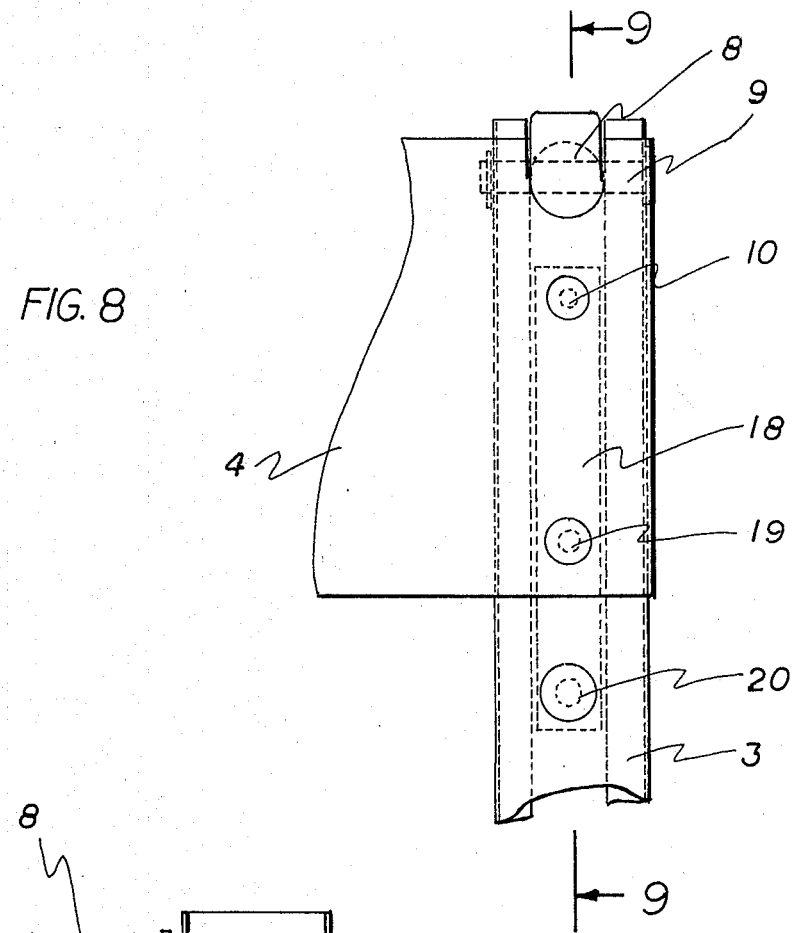
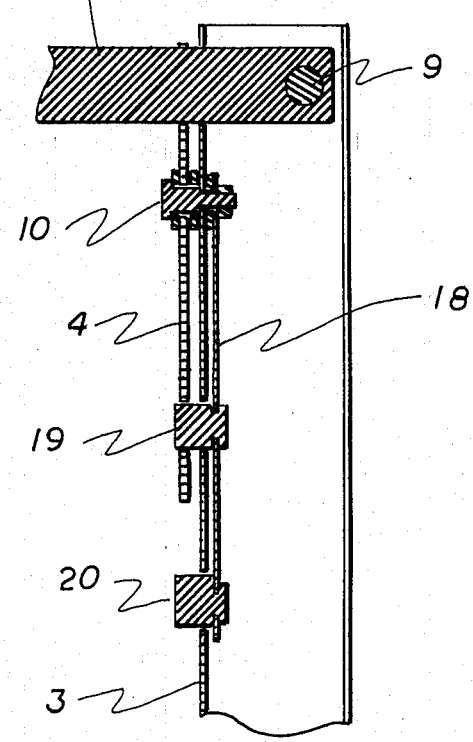
FIG. 8
FIG. 9

RACK FOR BICYCLES

BACKGROUND OF THE INVENTION

1. Field of the Invention

This invention relates to support racks for attachment to automobiles or the like to transport bicycles.

2. Description of the Prior Art

Automobile bicycle support racks have been made and used which support the bicycles at the rear of the vehicle, either mounted at a sloping angle on the inclined surfaces of the vehicle or as upright rectangular racks mounted on the vehicle bumper. The carried bicycles are more conveniently placed on the bumper-style racks, and are generally carried on these racks with less probability of damage, since they are supported in an upright position, for example as shown in U.S. Pat. No. 3,927,811.

The bumper-style racks present a difficulty because of the large variety of bumper shapes used on automobiles. These are generally accomodated by using brackets which are clamped or bolted to the bumper. These are large and unsightly, and inconvenient to attach and remove. In cases where the upper edge of the bumper is not accessible, as in some current bumper designs, these cannot be used.

The racks themselves are cumbersome and inconvenient to handle and store when they are not in use, since they are large and have protruding arms. They may be disassembled for storage, but this generally requires tools, is troublesome, and may result in loss of parts. Some attempts have been made to design racks which can be more conveniently be stored. For example, the design shown in U.S. Pat. No. 4,050,616 is intended to be permanently mounted on the vehicle bumper and telescoped for storage. It is quite complicated and appears costly to produce. The design shown in U.S. Pat. No. 4,088,253 is compact but requires a variety of fittings to accomodate a range of bumper styles. Its provisions for securing the bicycles being carried are somewhat less rigid than those of other designs.

Some existing types of removable racks allow a degree of foldability, as for example that shown in U.S. Pat. No. 3,927,810. However, the folded configuration still requires a considerable storage area, since while it folds flat its various members are not brought into close proximity. The process of folding it calls for a considerable amount of manipulation.

SUMMARY OF THE INVENTION

My invention is directed toward overcoming the disadvantages noted in the prior art by providing a support rack which can, without the use of tools and auxiliary parts, be quickly and easily installed and removed from vehicles and easily folded to a minimum volume for convenient storage.

The rack of the present invention includes a pair of elongated vertical support members which are joined at their upper ends to form a rectangular array which can be supported on the bumper of a vehicle and held in an upright position by straps which may be hooked to a convenient body edge, such as the upper edge of the trunk lid. The lower ends of the support members are provided with hooks which engage either the upper or lower edge of the bumper and allow the rack to rest upon the upper surface of the bumper, avoiding the use of clamps or bolts. The hooks are held in contact with the bumper edge by the reaction of the tension forces in the straps at the upper end of the rack acting about a pivotal line.

The upper straps are provided with means for easy adjustment of their lengths to the particular vehicle on which the rack is to be used. Once this adjustment has been made, the rack may be easily and quickly be installed by setting it on the top surface of the bumper, engaging the hooks at its lower end with the bumper edge, pushing forward at the top of the rack to flex the support members, and engaging the hooks at the ends of the upper straps with the vehicle body. Removal of the rack is accomplished by carrying out these steps in the reverse order.

The vertical support members are joined at their upper ends to a horizontal cross member through pivots which allow the support members to be rotated to a folded position parallel with and close to the cross member for storage. The upper part of the rack also is provided with horizontally projecting carrying members on which the bicycles are carried. These carrying members are also pivotally mounted so that they may be folded to a position parallel with the other members for storage, thus providing a storable configuration of minimum size. When the rack is unfolded for installation and use, locking means are engaged to hold the rack in its rectangular array form. These locking means are engaged and disengaged without use of tools or adjustments.

One object and feature of my invention is to provide a bicycle support rack which can be conveniently and easily folded to a minimal size for storage.

A further object, feature, and advantage of my invention is to provide a bicycle support rack which can be installed on several different bumper configurations.

An additional object and feature of my invention is to provide a support rack which can be quickly and easily extended and installed for use and removed and folded for storage without the use of tools, adjustments, or auxiliary parts.

The above brief description as well as further objects, features, and advantages of my invention will be more fully appreciated by reference to the following detailed description thereof, when taken in conjunction with the accompanying drawings.

BRIEF DESCRIPTION OF THE DRAWING

Referring to the Drawing wherein like numerals represent like parts throughout the several views:

FIG. 8 is an enlarged front elevation of the top portion of another embodiment of my invention.

FIG. 9 is a sectional view taken along the line 9—9 indicated on FIG. 8.

Figure 1:
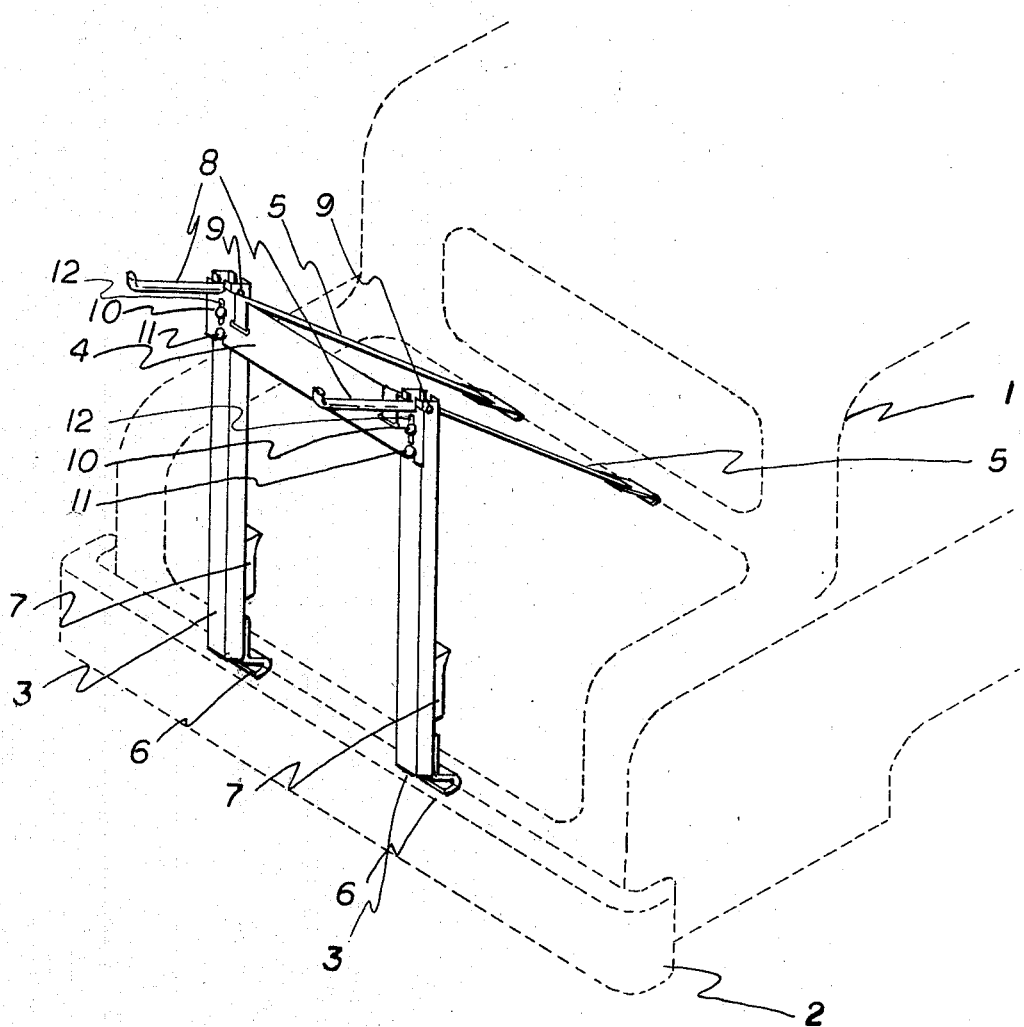
FIG. 1 is a fragmentary perspective view of a vehicle with one embodiment of my invention mounted thereon.

Turning first to FIG. 1, there is shown the rear portion of a conventional automobile 1, having a rear bumper 2 on which rest the two support members 3 of the rack, which are connected near their upper ends to the cross member 4. Upper strap means 5 are connected to cross member 4 and secured to the vehicle at their opposite ends to hold the rack in an upright position. Hooks 6 secure the lower ends of support members 3 to the top inner edge of bumper 2. Spacers 7 bear against the rear surface of vehicle 1, acting as a fulcrum for the tension in upper strap means 5 to hold hooks 6 in contact with the upper edge of bumper 2. Carrying members 8 are mounted near the upper ends of support members 3 by pivots 9.

Figure 2:
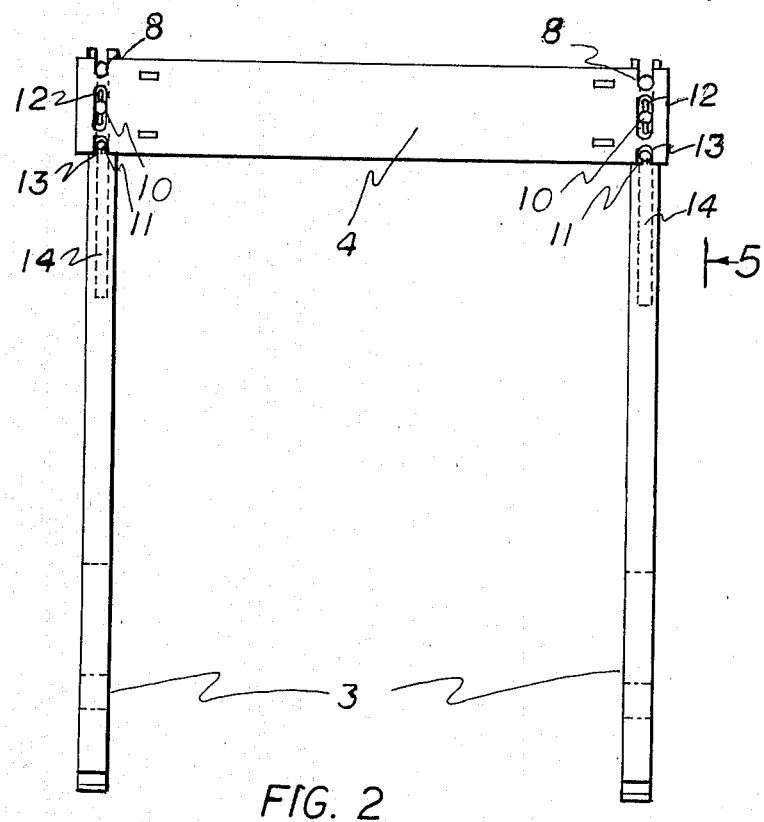
FIG. 2 is a front elevation view of the embodiment shown in FIG. 1, showing the embodiment in its extended position.

FIG. 2 shows more clearly the means of attachment of support members 3 to cross member 4. Pivots 10 are mounted on support members 3 and project through and are retained by elongated slots 12 in cross member 4 to allow cross member 4 a limited range of vertical displacement along support members 3, while permitting support members 3 to rotate about pivots 10. Projecting studs 11 mounted on support members 3 engage the corresponding slots in the lower edge of cross member 4 to further limit vertical displacement and to lock support members 3 at right angles to cross member 4 when projecting studs 11 are engaged in the corresponding slots 13. Carrying members 8 rest in notches in the upper ends of support members 3 and in corresponding notches in the upper edge of cross member 4 to further lock support members 3 at right angles to cross member 4. Slots 14 in the rear surfaces of support members 3 provide space to accomodate carrying arms 8 when they are rotated on pivots 9 to their folded positions.

Figure 3:
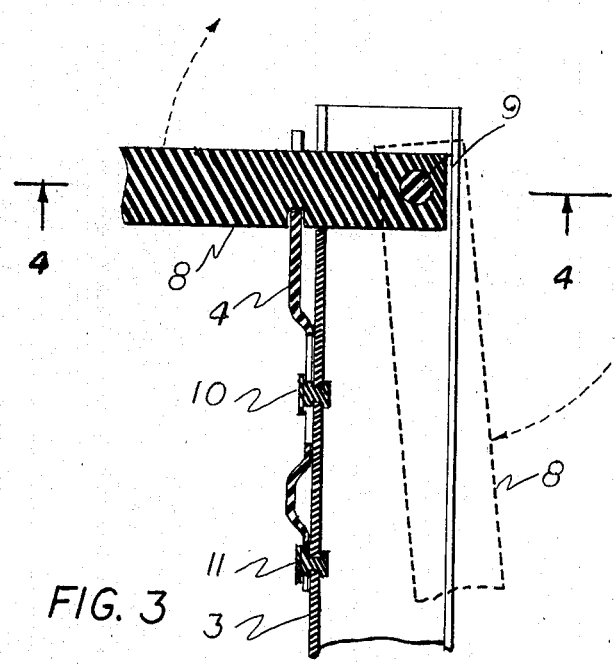
FIG. 3 is a sectional view of the top portion of the embodiment, showing details of the manner of interconnection of its parts.

FIG. 3 shows in greater detail the manner in which the downward displacement of cross member 4 locks cross member 4 and support members 3 in a rectangular array, and also shows the manner in which carrying members 8 may be rotated about pivots 9 to their folded positions in the rear faces of support members 3.

Figure 4:
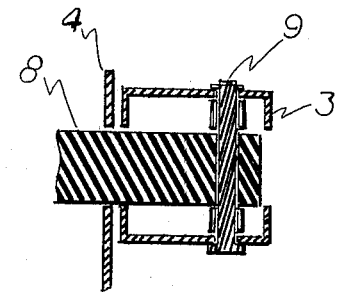
FIG. 4 is a sectional view of the top portion of the view shown in FIG. 3, taken along the line 4—4 of FIG. 3.

FIG. 4 shows further detail of the manner in which carrying member 8 is mounted on support member 3 by means of pivot 9 to fit into the coincident notches at the top edges of support member 3 and cross member 4.

Figure 5:
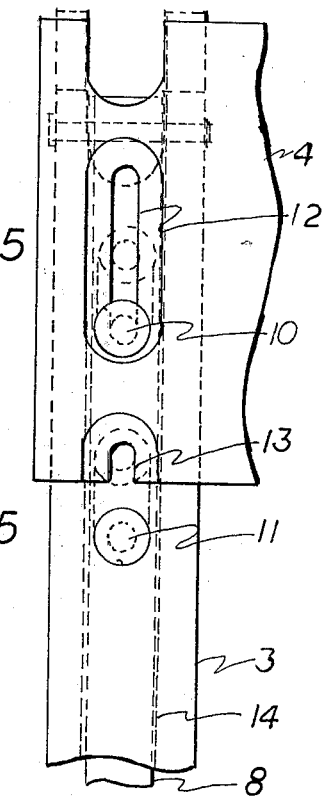
FIG. 5 is an enlargement of a top portion of the view shown in FIG. 2, in the general area indicated by line 5—5.

FIG. 5 shows more clearly the details of the interconnections between support members 3, cross member 4, and carrying members 8, one of which is here shown in its folded position. Cross member 4 is shown in its most upward displaced position, with stud 11 disengaged from corresponding slot 13, thus allowing support member 3 to rotate about pivot 10. Upward displacement of support member 3 relative to cross member 4 to bring stud 11 into engagement with slot 13 is shown in broken lines.

Figure 6:
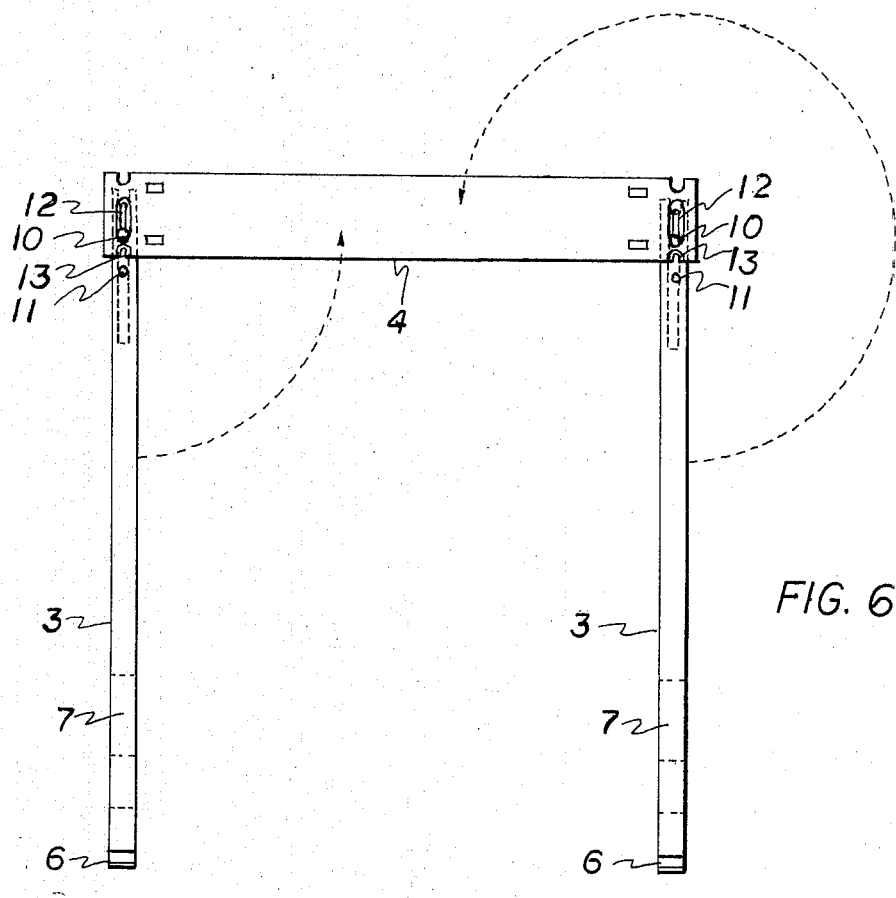
FIG. 6 is a front elevation view of the embodiment shown in FIG. 2, showing the rack preparatory to folding.

FIG. 6 shows carrying members 8 folded behind support members 3 and cross member 4 displaced upward relative to support members 3, disengaging studs 10 from slots 13 preparatory to folding support members to their folded positions as shown by the broken arrows.

Figure 7:
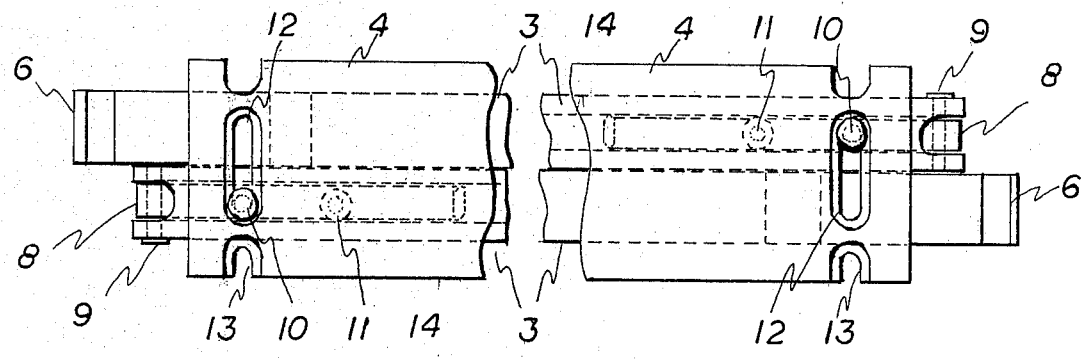
FIG. 7 is an enlarged partial front elevation view of the embodiment in its folded configuration.

FIG. 7 shows the rack, with its central portion removed to more clearly show the details of the functional parts, with carrying members 8 and support members 3 folded, completing the action indicated by the broken arrows in FIG. 6. Pivots 10 have been slid to opposite ends of slots 12 to allow support members 3 to lie parallel with each other and with cross member 4, while carrying members 8 are nested within slots 14 in the rear faces of support members 3.

FIG. 8 shows a partial front elevation view of an alternate embodiment of the invention, while FIG. 9 is a partial sectional view taken generally along the line 9—9 in FIG. 8. This alternate embodiment provides another means for locking the rack into its rectangular array form for installation and use. The views show the interconnections between one end of cross member 4, one of the support members 3, and one carrying arm 8. The interconnections between the other support member 3 and the other carrying member 8 with the other end of cross member 4 are similar, except for the location of pivot 10. In the view shown, pivot 10 is located above the horizontal centerline of cross member 4 by a distance equal to one half the width of support member 3. The pivot 10 at the opposite end of cross member 4 is located an equal distance below this centerline. This allows the two support members 3 when in their folded positions to lie parallel with cross member 4 to provide for a folded configuration of minimum size.

Pivot 10 also serves as a fastening for one end of a leaf spring 18, located within the front face of each support member 3. Leaf spring 18 carries a locking post 19, which protrudes through an opening in the front face of support member 3 and engages a corresponding opening near the lower edge of cross member 4 when support member 3 is in its extended position for use. Support member 3 is thus held at right angles to cross member 4 by the combination of locking post 19 and pivot 10; an additional locking effect may be provided by the engagement of carrying member 8 with coincident notches in the top edges of support members 3 and cross member 4.

Leaf spring 18 additionally carries button 20, which projects through an opening in the front face of support member 3. Locking post 19 may be disengaged from the opening in cross member 4 by pushing button 20 inward. If carrying member 8 has been rotated to its folded position, support member 3 may then be rotated about pivot 10 to fold the rack for storage.

Figure 10:
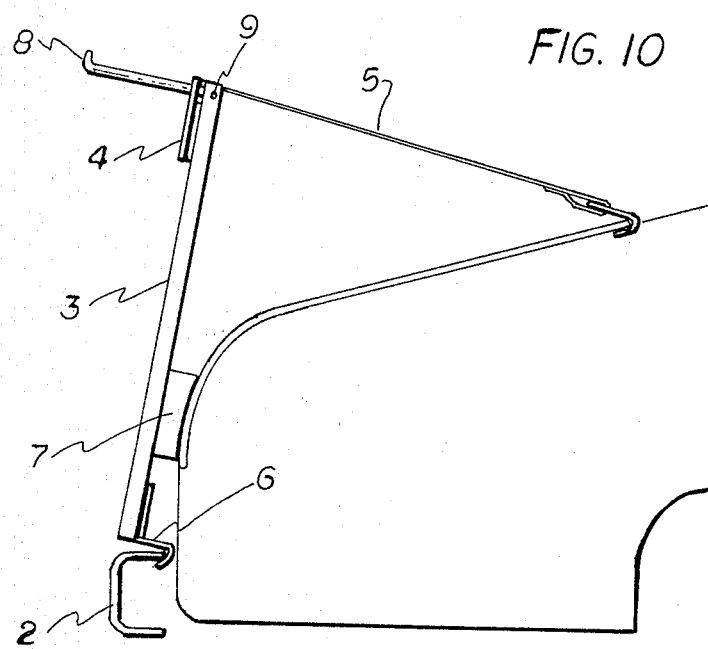
FIG. 10 is a side elevation view of the embodiment shown in FIG. 2, showing means of attachment of the rack to one vehicle configuration.

FIG. 10 illustrates the method of attachment of the embodiment to a conventional vehicle whose bumper has an upper inner edge which is accessible. The nature of this view makes only one support member 3 and its related parts visible; the disposition of the other set of parts should be understood to be the same as those shown and described here. Hook 6 engages the upper edge of bumper 2, preventing rearward displacement of the lower end of the rack. Spacer 7, made of a suitable resilient material to conform with and prevent marring the surface of the vehicle, acts as a fulcrum about which the force due to tension in the upper strap means 5 acts to hold hook 6 against the edge of bumper 2. The turning moment of the burden held of carrying member 8 is balanced by the tension in the upper strap means 5, which is adjusted in length to hold the rack in the desired upright position. When it is desired to remove the rack from the vehicle, the top of the rack is pushed toward the vehicle, flexing the support members 3 sufficiently to relax the upper strap means 5 so that it may be unhooked from the vehicle. The rack is then tilted backward to release hook 6 from the bumper.

Figure 11:
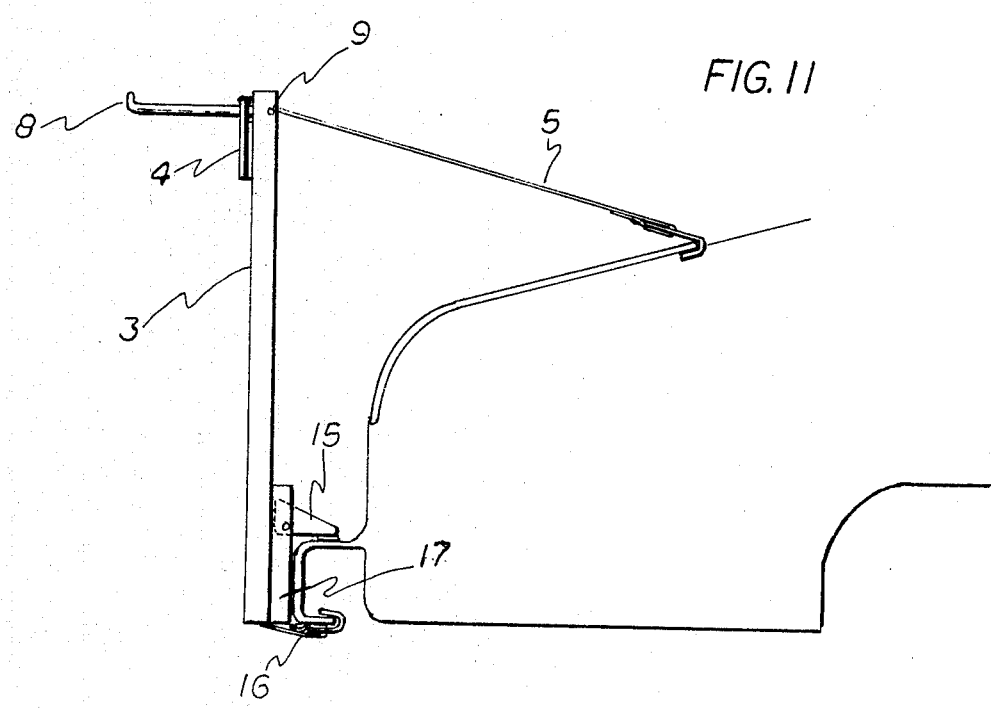
FIG. 11 is a side elevation view of another embodiment, showing an alternate means of attachment to the vehicle.

FIG. 11 shows an alternate embodiment of the means for attaching the rack to the bumper, useful for vehicles whose bumpers lack accessible upper edges or suitable rear contours. As in FIG. 10, only one support member 10 and its associated parts is visible in this view; the parts not shown are disposed in like manner to those shown and described. A horizontally projecting bracket 15 is mounted on support member 3 so as to rest upon the upper surface of bumper 2. The lower end of the rack is held against bumper 2 by a lower strap means 16, which is configured to engage the lower edge of bumper 2. The upper end of the rack is connected to the vehicle by upper strap means 5, as described above; tension in the upper strap means 5 acting about the point of contact of support member 3 and bumper 2 holds lower strap means 16 in contact with bumper 2. Bracket 15 is pivotted in channel member 17 so that bracket 15 may be folded within channel member 17 when the rack is folded for storage. Attachment and removal of the rack is accomplished in the same manner as was previously described.

While the embodiments described above illustrate the elements of the invention, it is intended that it be limited only by the lawful scope of the appended claims.

I claim:

1. A foldable rack mountable on vehicles, comprising:
   (a) a spaced pair of generally vertical support members, having their lower ends supported by the upper surface of the bumper or other projecting surface of the vehicle;
   (b) means for retaining lower ends of said support members on said upper surface;
   (c) a horizontal upper cross member;
   (d) means for pivotally interconnecting each end of said cross member with a point near the top end of one of each said support members; so as to allow each support member to rotate about an axis perpendicular to the plane common to said cross member and said support members from a position extended orthogonal to said cross member to a folded position parallel with and in close proximity to said cross member;
   (e) a pair of carrying members;
   (f) means for pivotally interconnecting one end of each said carrying member to the upper end of said rack adjacent a respective support member, so as to allow each said carrying member to rotate in a plane orthogonal to the plane common to said extended support members and said cross member, from an extended substantially horizontal position at a right angle to said respective support member to a folded position generally parallel with and in close proximity to said respective support member and said cross member;
   (g) means for locking said extended support members and said cross member in a substantially rectangular array, and
   (h) means for supporting said rack in a generally upright position.

2. A foldable rack according to claim 1, wherein:
   (a) the upper ends of said support members are configured so as to support said extended carrying members in a substantially horizontal position at right angles to said support members, and
   (b) the upper edge of said cross member is provided with means to engage said extended carrying members so as to lock said rack in a substantially rectangular array when said carrying members are in their extended positions, and to allow said support members to be rotated to their folded positions when said carrying members are rotated to their folded positions.

3. A foldable rack according to claim 1, wherein:
   (a) pivotal interconnections of said cross member with said support members are configured so as to allow limited vertical displacement of said cross member relative to said support members;
   (b) the lower edge of said cross member is provided with engagement means located at positions adjacent to the intersections of said cross member with said extended support members, and
   (c) said support members are provided with engagement means configured and disposed to interlock with said cross member engagement means when said support members are in their extended positions and said cross member is in its lowermost displacement, so as to lock said rack in a generally rectangular array, and to disengage when said cross member is in its upper most displacement to allow said support members to be rotated to their folded positions.

4. A foldable rack according to claim 1, wherein:
   (a) the lower edge of said cross member is provided with engagement means located at positions adjacent to the intersections of said cross member and said extended support members, and
   (b) said support members are provided with retractable engagement means, so disposed and configured to interlock when extended with said corresponding cross member engagement means when said support members are in their extended positions so as to lock said rack in a generally rectangular array, and when said support member engagement means are retracted to allow said support members to be rotated to their folded positions.

5. A foldable rack according to claim 1, wherein:
   (a) the upper end of said rack is connected to said vehicle by strap means configured to be captively held to said vehicle and support said rack in a generally upright position;
   (b) lower ends of said support members are configured to rest adjacent to the upper surface of said bumper and engage the upper edge of said bumper so as to constrain said lower ends from movement away from said vehicle, and
   (c) spacer means are provided on each said support member, disposed and configured to be held against an adjacent generally vertical surface of said vehicle by the tension in said strap means, and said spacer means acting as pivotal points to cause tension forces in said strap means to maintain said lower ends against said bumper edge, thereby locking said rack in a generally upright position.

6. A foldable rack according to claim 1, wherein:
   (a) the upper end of said rack is connected to said vehicle by strap means configured to be captively held to said vehicle and support said rack in a generally upright position;
   (b) said support members are provided with horizontally extended bracket means, disposed and configured to rest on the upper surface of said bumper so as to support the weight of the rack and its burden, and (c) the lower ends of said support members are provided with interconnection means configured and disposed to be captively held to the lower edge of said bumper so as in cooperation with said strap means to maintain said bracket means resting upon the upper surface of said bumper and lock said rack in a generally upright position.

* * * * *